United States Patent [19]

Larsen et al.

[11] Patent Number: 4,884,262

[45] Date of Patent: Nov. 28, 1989

[54] MAGNETIC SYSTEM FOR A STEREO PICK-UP WITH A MOVABLE COIL

[75] Inventors: Jan Larsen, Herlev; Robert Gudmandsen, Pr sto; Per Winfeld, Lyngby, all of Denmark

[73] Assignee: Ortofon Manufacturing A/S, Valby, Denmark

[21] Appl. No.: 78,524

[22] PCT Filed: Nov. 18, 1986

[86] PCT No.: PCT/DK86/00127

§ 371 Date: Jul. 17, 1987

§ 102(e) Date: Jul. 17, 1987

[87] PCT Pub. No.: WO87/03157

PCT Pub. Date: May 21, 1987

[30] Foreign Application Priority Data

Nov. 18, 1985 [DK] Denmark ............................ 5317/85

[51] Int. Cl.[4] ............................................ G11B 3/00

[52] U.S. Cl. .................................... 369/136; 369/170; 369/147

[58] Field of Search ............................... 369/136–139, 369/146–149, 173, 170

[56] References Cited

U.S. PATENT DOCUMENTS

| | | | |
|---|---|---|---|
| 3,299,219 | 1/1967 | Madsen | 369/139 |
| 4,093,833 | 6/1978 | Tsukamoto | 369/136 |
| 4,161,631 | 7/1979 | Matsuda | 369/139 |
| 4,233,476 | 11/1980 | Ikeda | 369/136 |
| 4,367,544 | 1/1983 | Fidi et al. | 369/136 |
| 4,488,284 | 12/1984 | Aoki et al. | 369/147 |

*Primary Examiner*—Alan Faber
*Assistant Examiner*—James E. Tomassini
*Attorney, Agent, or Firm*—Fleit, Jacobson, Cohn, Price, Holman & Stern

[57] ABSTRACT

In a stereo pick-up having movable coils (14) and an SmCo magnet (22) with a high energy content, with the coil system (14, 15, 18) arranged in front of one pole face of said magnet, a yoke plate (23) of a magnetic soft material is arranged in front of said system to increase the magnetic induction in the coils. The great coercive force of the magnet is utilized for simplifying and reducing the costs of the mechanical structure in that the yoke plate is formed with two legs (26) which extend rearwardly, engage and are secured to two opposite sides of the magnet. The short-circuit of the magnet established by these legs has no noticeable impact on the induction in the air gap because of the high coercive force of the magnet. The manufacturing costs of the magnet system are additionally reduced in that, instead of a hole to receive a mounting assembly (16) for the coil system, the magnet, whose material is very hard, is formed in its underside with a slot (30) in whose bottom the mounting assembly is arranged and secured by means of a plate-shaped projection (31) on a casing member (32) of plastics.

4 Claims, 3 Drawing Sheets

MAGNETIC SYSTEM FOR A STEREO PICK-UP WITH A MOVABLE COIL

BACKGROUND OF THE INVENTION

Magnetic systems for pick-ups working according to the moving coil principle are usually constructed as a ring-shaped yoke circuit consisting of a permanent magnet, pole shoes and an air gap in which the armature or coil system of the pick-up is placed.

The air gap may be positioned at various locations in the magnetic circuit and thus utilize the magnet more or less efficiently, corresponding to greater or smaller flux density in the air gap with the same magnetic volume.

Usually, the magnet is the most expensive component in the magnet circuit, and until a few years ago mainly Alnico magnet types were used. These magnets are characterized by an energy product $(BH)_{max}$ of 4 to 10M gauss- sted for the anisotropic types corresponding to a magnetic induction $B_r$ of about 7 to 13K gauss and coercive forces H from 0.7 to 1.9K rsted. It is moreover characteristic of these magnets that with a square cross-section the length-width ratio will be $>1$ corresponding to bar shape owing to the relatively low coercive force. When these magnets are loaded with a yoke circuit, the magnetic induction $B_r$ declines along a working line depending upon load and magnet type. To reduce the costs of magnet volume, the circuit is usually dimensioned to the working point which gives $(BH)_{max}$.

Owing to the elongate shape there will be a considerable loss, also in an incorporated state, because of stray fields around these magnets. Where possible, the magnet is therefore positioned preferably directly up to the active air gap.

Recent years have seen the development of high energy magnets based on samarium cobalt alloys with energy products of 20 to 27M gauss- rsted.

In particular the very high coercive force of 5 to 8K sted makes them interesting for use in pick-ups. One reason is that the magnets give approximately the same $B_r$ with a smaller volume, another is that the high coercive force entails that optimum dimensioning gives disc-shaped magnets instead of bar-shaped ones, which is very expedient because of the miniaturization taking place within the pick-up field.

In moving coil pick-up systems, it is essential to have a powerful homogenous field in the air gap where the windings move.

The high energy magnets have the field radiation concentrated on the pole faces to a higher degree than an isotropic Alnico type, where a major part of the radiation occurs from the sides at right angles to these.

To utilize the properties of the high energy magnets optimally, at least one of the pole faces of the magnet should restrict the air gap. The air gap induction is increased significantly by arranging a U-shaped yoke, illustrated in FIG. 2, in the usual manner, said yoke connecting the two pole faces with each other around the air gap. However, considerations of space in moving coil phone cartridges and also process-technical considerations in the production may cause another structure of the magnet circuit, which is the idea of the invention.

SUMMARY OF THE INVENTION

The invention concerns a magnet system of the type defined in the introductory portion of claim 1, and its object is to provide such a magnet system which utilizes the mentioned properties in high energy magnets to simplify and thereby reduce the costs of pick-up magnet circuits. This is important especially as these magnets are still considerably more expensive than the Alnico types mainly because of the working costs.

This object is achieved in that the pick-up is constructed as stated in the characterizing portion of claim 1, since the high coercive force of the magnet makes it possible to place magnetically conductive parts at the side or sides of the magnet, without the magnet being loaded noticeably. The yoke member does not have the ordinary yoke function of directing the flux lines from one pole face back to the other pole face, but is merely to collect and concentrate the flux lines emanating from the pole face, so that the greatest possible part of these extends through the intermediate armature. In the stated structure, the yoke member is fixed with respect to the magnet by simple means and in a manner which makes the assembling procedure more inexpensive, since the magnet, coil system and yoke can be mounted axially, which is an advantage in automatic assembling procedures.

Thus, it is the idea of the invention that solely by mounting a magnetically conducting yoke plate at a short distance from one of the pole faces, such a concentration of the flux lines will be obtained from the pole face toward the yoke plate that the induction, depending upon the distance between the mentioned faces, will be increased.

As stated in claim 2, also a permanent magnet may be used with its opposite pole at the position of the yoke plate, resulting in an even more powerful air gap induction—also when no other return path is used for the flux than the air between the pole faces facing away from the air gap.

The great hardness of the magnet makes it difficult to drill such a hole with a small diameter with respect to the length for mounting of attachment means for the armature and coil system as is present in the mentioned known pick-up. A considerable manufacturing simplification can be obtained when the magnet system has the structure stated in claim 3, as the track can relatively easily be produced by a rotating disc. A suitable object, e.g. moulded in plastics, can then be placed in this track, in such a depth as to produce a through bore.

The invention will be explained more fully below with reference to the drawing, in which

DESCRIPTION OF THE PREFERRED EMBODIMENTS

Figure 1:
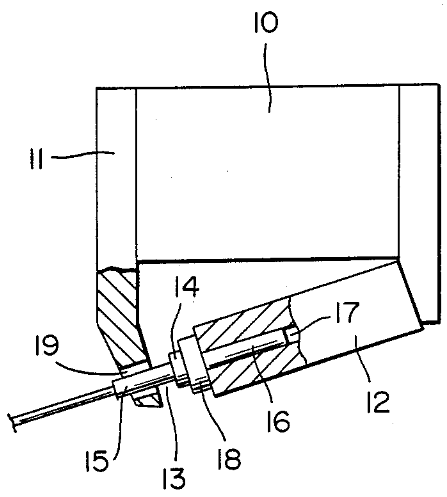
FIGS. 1 and 2 show two generally known pick-up structures, partially in section.

In FIG. 1, 10 is a bar-shaped permanent magnet on whose pole faces yoke members 11 and 12 are placed. The ends of these define an air gap 13 in which an armature 14, provided with coils and secured to a stylus arm 15, is movably positioned by means of a mounting assembly 16, introduced into an axial hole 17 in the yoke member 12, and a damper pad 18. The stylus arm 15 extends through a hole 19 in the yoke member 11.

Figure 2:
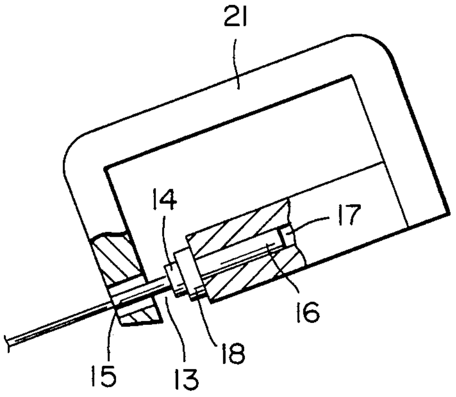

The same reference numerals for corresponding parts are used in FIG. 2 as in FIG. 1, viz. for the air gap 13, the armature 14, the stylus arm 15, the mounting assembly 16, the hole 17, the damper pad 18 and the hole 19. The air gap 13 is here disposed between one end of a bar magnet 20 and one end of a U-shaped yoke 21, whose other end engages the other end of the magnet. Here, the hole 17 to receive the mounting assembly of the armature is thus formed in the magnet.

Figure 3:
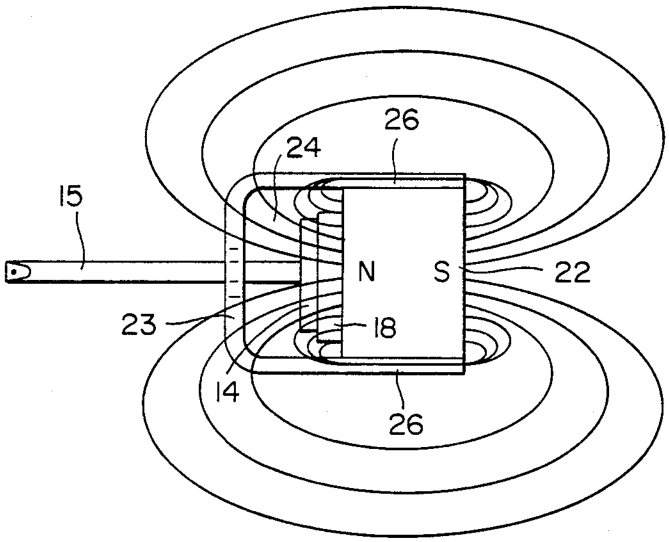
FIGS. 3 and 4 are a bottom and a side view, respectively, of the essential parts of pick-up structures with their respective embodiments of the magnet system of the invention.
Figure 4:
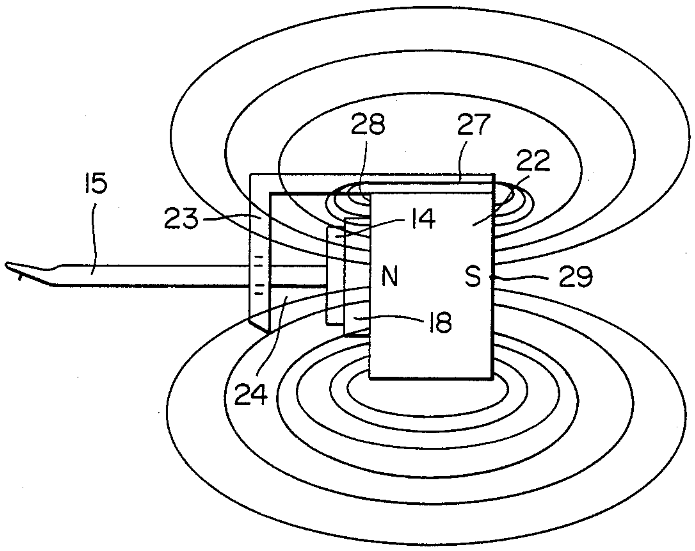

The armature, stylus arm and damper pad are also designated by 14, 15 and 18, respectively, in the pick-up structure shown in FIGS. 3 and 4. In these structures, the armature assembly with damper pad is arranged on one pole face of an SmCo magnet 22, which is made very short owing to the high coercive force so that it is almost disc-shaped.

In FIG. 3, a yoke plate 23 is placed in front of the armature 14, said yoke plate being a magnetic soft, high-saturable material, e.g. iron or an iron nickel alloy. This yoke plate collects and concentrates the magnetic flux lines and thus increases the induction between the air gap, here designated by 24, which is interposed between the yoke plate and the magnet pole face, so that the sensitivity of the pick-up is improved correspondingly. The yoke plate 23 is secured in a simple manner in that it is shaped with two legs 26 which extend rearwardly and engage the sides of the magnet 22 to which they are secured in a suitable manner.

An intermediate layer may optionally be provided between these legs and the magnet. The circumstance that the legs 26 form magnetic short-circuit paths for the magnet has no greater impact on the induction in the air gap 24 owing to the great coercive force of the magnet.

FIG. 4 shows a slightly amended embodiment where the yoke plate 23 has just one leg 27 which engages one side of the magnet 22.

No matter whether the yoke plate is shaped like an L or a U, the legs 26 and 27 primarily serve to retain the yoke 23 with respect to the pole face 28 of the magnet. These side members are therefore not essential parts of the magnet circuit, except that, of course, they give rise to a certain short-circuit of the poles 28 and 29 at the point where they are disposed in close proximity to the pole faces. However, the high coercive force of the magnet causes this load to have no importance. The air gap with the high induction is exclusively formed by one pole face 28 on the magnet and the yoke 23.

Figure 5:
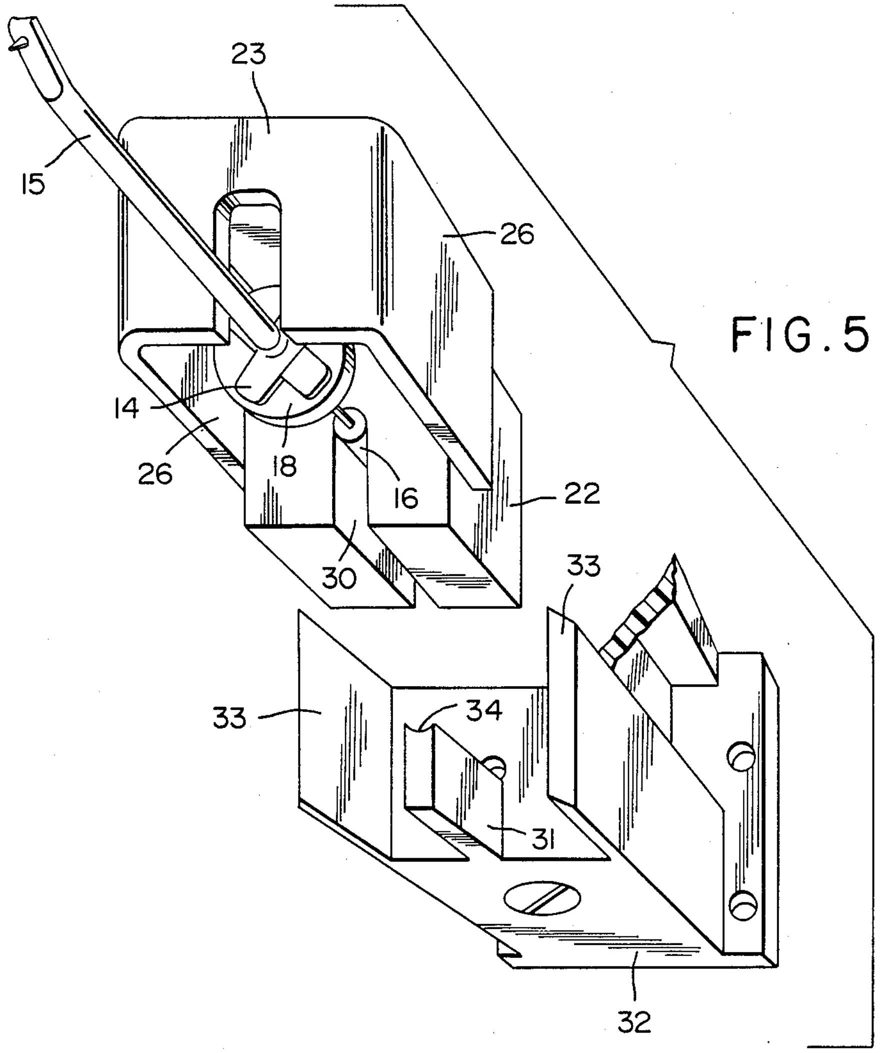
FIG. 5 is a perspective, partially exploded view of a complete pick-up with the magnet system shown in FIG. 3.

The armature system may be retained in the structures of FIGS. 3 and 4 in a manner similar to that shown in FIGS. 1 and 2 by means of a mounting system arranged in a hole in the magnet. Owing to the great hardness of the magnet, it is a difficult and rather expensive operation to drill a hole in the magnet with a small diameter with respect to the length. FIG. 5 shows an embodiment of the structure of FIG. 3 which is easier and cheaper to manufacture. Here, instead of a drilled hole, the magnet is formed with a slot 30 extending in the field direction in the underside. Such a slot is relatively easy to produce with a rotating disc. The cylindrical mounting assembly 16 is arranged and retained in the bottom of the slot 30 by means of a plate-shaped central projection 31 on a casing member 32, which may be moulded in plastics and additionally has two plate-shaped lateral projections 33 designed to be pushed in around and engage the outer sides of the legs 26 of the yoke plate 23. The upper edge face of the central projection 31 is formed with a groove 34 of circular-arc shape in cross-section with the same radius as the mounting assembly 16.

We claim:

1. A magnet system for a stereo pick-up with a movable coil and containing a permanent magnet with a high energy product, characterized in that the magnet system comprises an L- or a U-shaped yoke member of magnetically conductive or permanent-magnetic material, and that one leg of said yoke member is disposed in opposite and somewhat spaced as well as substantially parallel relationship with a pole face of the magnet, while the other leg or legs are disposed in engagement with or closely adjacent to one magnet side or their respective magnet sides parallel with the field direction.

2. A magnet system according to claim 1, characterized in that the yoke member is formed by a second permanent magnet with a high energy product and so oriented that the two pole faces directed toward each other have opposite polarity.

3. A magnet system according to claim 1, characterized in that the magnet is formed with a track extending in the field direction from one pole face to the other.

4. A magnet system according to claim 2 characterized in that the magnet is formed with a track extending in the field direction from one pole face to the other.

* * * * *